United States Patent [19]
Marzocchi et al.

[11] Patent Number: 5,988,332
[45] Date of Patent: Nov. 23, 1999

[54] HYDRAULIC SHOCK ABSORBER

[75] Inventors: Paolo Marzocchi, Bologna; Loris Vignocchi, Zola Predosa; Sandro Musiani, Marzabotto, all of Italy

[73] Assignee: Marzocchi S.P.A., Zola Predosa, Italy

[21] Appl. No.: 09/119,925

[22] Filed: Jul. 21, 1998

[30]   Foreign Application Priority Data

Jul. 23, 1997   [IT]   Italy ................................ BO97A0448

[51] Int. Cl.[6] ........................................................ F16F 9/00
[52] U.S. Cl. ..................... 188/322.2; 188/298; 188/314
[58] Field of Search ................. 188/266.6, 322.19,
188/314, 298, 321.11, 322.2, 269, 322.14;
285/382, 382.1, 382.2, 382.4, 261, 263,
425, 122.1, 271; 267/64.15, 64.28, 64.19,
64.21, 64.27; 138/30; 137/318; 220/565

[56]             References Cited

U.S. PATENT DOCUMENTS 1,046,091   12/1912   Liebau .
2,796,955   6/1957   Klein .
3,499,639   3/1970   Bonnottz .
3,837,292   9/1974   Wieba .
3,887,174   6/1975   Whelan et al. .
4,010,829   3/1977   Naito et al. ............................ 188/314
4,129,306   12/1978   Konno et al. .......................... 285/261
4,438,793   3/1984   Brown .
4,921,004   5/1990   Lane et al. .............................. 138/30
5,533,596   7/1996   Patzenhauer et al. ............... 188/322.2
5,788,028   8/1998   Bieber ................................. 188/266.6

Primary Examiner—Douglas C. Butler
Attorney, Agent, or Firm—King and Schickli

[57]             ABSTRACT

The compensator is made separately from the cylinder of the shock absorber, and the two parts are prearranged for the reciprocal coupling with the possibility of articulation and pivoting around an axis, substantially perpendicular or orthogonal to the axis of the shock absorber and eventually also with the possibility of articulation around the cylinder of the shock absorber itself.

7 Claims, 1 Drawing Sheet

HYDRAULIC SHOCK ABSORBER

DESCRIPTION

The present invention relates to hydraulic shock absorbers which are used alone or in pairs for the manufacture of telescopic fork for bikes and motorbikes, said shock absorbers being made up of a cylinder, closed at one end, such end connecting the shock absorber to a first point of the mechanism which has to be cushioned, said cylinder containing a piston which runs with lateral seal and which is integral with a stem coming, with lateral seal, out of the bushing which closes the other end of the said cylinder and which, with its outside end, is to be connected to the second point of the said mechanism which has to be cushioned. One of the inside chambers of the shock absorber, usually the one with the larger section, is connected to the so-called compensator, composed of a chamber with changing volume, defined partially by a piston or by a diaphragm and whose volume increase is contrasted by an elastic means, usually a pressurized gas. The compensator allows the shock absorber to work with the inside chambers full of liquid, since it absorbs and then releases the liquid excesses which cannot be exchanged between the said chambers by means of the valve means, usually fitted onto the piston of the shock absorber itself.

In the shock absorbers of the known type, when the compensator is placed laterally to the shock absorber itself, the compensation chamber is usually obtained as one piece with the cylinder of the shock absorber itself. What follows is that the compensator is placed in a fixed and predetermined position in relation to the shock absorber, so that the latter cannot be fitted up when the compensator interferes with a component of the bike or motorbike. The present invention aims at eliminating this disadvantage with the following solution idea. The compensator is made separately from the cylinder of the shock absorber and the two parts are prearranged for the reciprocal coupling, with the possibility of being articulated and jointed around an axle, substantially perpendicular or orthogonal to the axle of the shock absorber, and, possibly, with the possibility of being articulated around the cylinder of the shock absorber itself.

Other features of the invention, and the advantages deriving from them, will became more evident from the following description of a preferred form of embodiment of the invention, shown by way of non-limiting example, in the figures of the attached drawing, in which.

Figure 2:
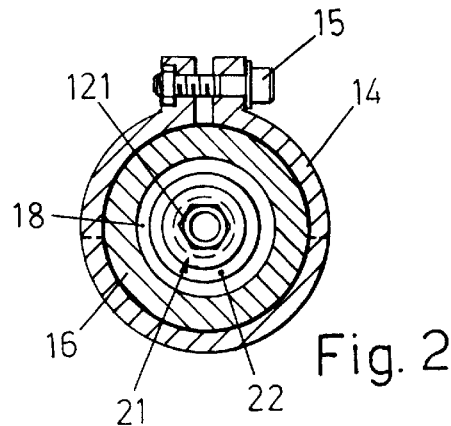
FIG. 2 shows a detail obtained according with the section line II—II in FIG. 1.
Figure 1:
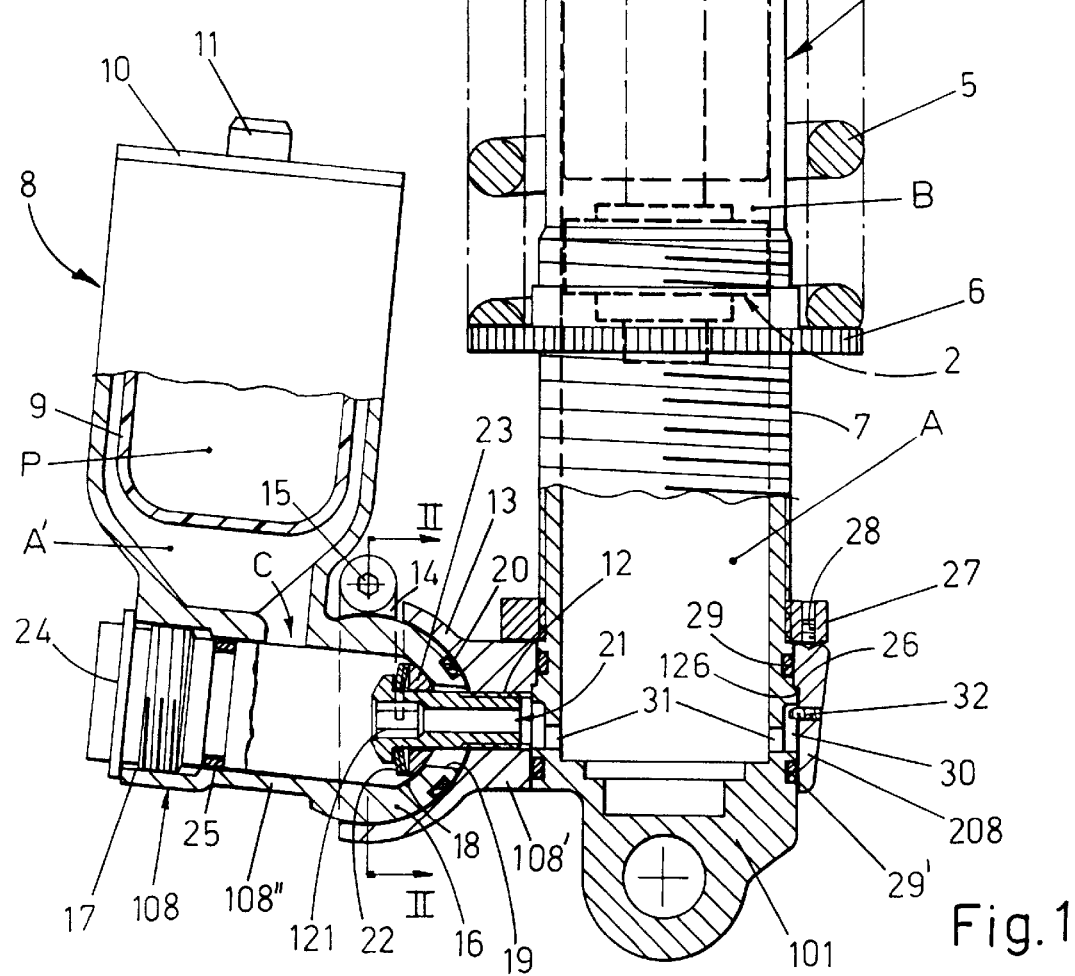
FIG. 1 shows the shock absorber partially sectioned according to the plane containing both the axis of the shock absorber itself and the axis of the compensator, the two parts being prearranged so as to turn on two axes which are substantially reciprocally perpendicular or orthogonal.

In FIG. 1, the numeral 1 indicates the cylindrical body or the so-called cylinder of the shock absorber, closed on end 101, said end being prearranged for the connection to one of the points of the mechanism which has to be cushioned, in said cylinder running, with lateral seal, the piston 2 which is integral with the stem 3, which crosses with lateral seal the bushing 4 sealing the cylinder 1 on its other end. The end 103 of the stem is prearranged for the connection to the second point of the mechanism which has to be cushioned, and the stem itself is usually stressed in extension by a spring 5 abutting, with one end, onto a cup 203 of the stem itself, while, with the other end, it abuts onto a metal ring 6 which is screwed onto a an outside threaded portion 7 of the cylinder 1. A and B indicate the inside chambers, respectively with larger and smaller section, of the shock absorber, both full of liquid. In the piston 2 valve means are usually provided, in some cases adjustable by means of a device axially crossing the stem 3, such device being accessible to be operated from the end 103 of the stem itself. These means are not considered here since they have no bearing on the comprehensive area of the present invention.

In FIG. 1, the numeral 8 indicates the compensator 8, placed laterally to the cylinder 1, whose chamber has its inside volume divided into two parts, for instance by means of a flexible diaphragm 9, the chamber portion indicated with A' being full of liquid and communicating with the chamber A of the shock absorber through a opening C, which has been provided in the extension 108 connecting the compensator to the cylinder 1 itself, while the other chamber portion indicated with P is closed by means of a plug 10 equipped with valve means 11 which allow to introduce some gas under a suitable pressure into the chamber P itself. While the shock absorber is working, the chamber A' of the compensator absorbs and releases the liquid excesses which, from the chamber A, cannot flow into the chamber B through the valve means—which are not shown here—placed in the piston 2. The gas pressure in the chamber P creates an elastic component which is added to the one of the spring 5. In the opening C, connecting the chamber A to chamber A', are in some cases provided adjustable valves means, though not shown here, such means allowing to suit better the characteristics of the shock absorber to the different use demands.

In a shock absorber of the type described above or equivalent type, for example with a piston instead of the diaphragm 9, and/or with an adjustable spring instead of the gas pressure in the chamber P, the present invention aims at providing the following improvement. The extension 108, which connects the compensator to the cylinder of the shock absorber, is equipped with a spherical joint, so that the compensator itself can be turned around an axis, substantially perpendicular or orthogonal to the axis of the cylinder 1, and it can, at the same time be swung onto such axis. From FIG. 1 it is evident that the portion 108' of the extension 108, turned towards the cylinder 1 (see below), is equipped with an axial threaded hole 12 and with an hemispherical seat 13 which ends with a portion 14 with elastic clamp and clamping screw 15. In the aforesaid hemispherical seat the spherical head 16 of the extension portion 108", integral with the compensator 8, is placed, such portion being equipped with an axial cavity progressively decreasing towards the shock absorber, and, more precisely, including: a first cylindrical portion 17 with a longer diameter and threaded at the beginning, such portion reaching the spherical head 16; a tapered spherical portion, concentric to the head 16; an end cylindrical portion 19 with a diameter appropriately longer that the diameter of the said threaded hole 12. On one of the two spherical surfaces 13 and 16 of the joint, for instance on the head 16, a ring-shaped recess is provided, such recess being concentric to the axis of the hole 19 and being engaged by a seal 20 which ensures the reciprocal sealing connection of the said spherical surfaces. In the axial cavity of the extension portion 108" of the compensator an axially hollow screw 21 is introduced, such screw being screwed into the threaded seat 12 and against whose head at least one elastic means abuts, for instance a cup spring 22 operating onto a ring 23 made of a suitable material, which, with its spherical front, operates with contact with the rounded portion 18 of the seat housing the portions we are dealing with. The portion 121 of the axial cavity of the screw 21 has the shape of an embedded hexagon so that this component can be screwed by means of a hexagonal key. The screw 21 with the spring or springs 22 and the ring 23, keep the reciprocal connection and the possibility of articulation and pivoting between the portions 108' and 108" of the extension 108, so that the compensator can be directed in the desired position and can then be blocked in such position by means of the screw 15 and of the clamp 14. The seat 17 of the extension portion 108" is then sealed towards the outside by means of a plug 24 with sealing means 25. In order to adjust the flow of the liquid which flows in the opening C connecting the compensator to the shock absorber, suitable adjustable valve means, may be fitted into the plug 24.

From FIG. 1 it is evident that the extension portion 108' is integral with a bushing 208, which has an inside round section and which is prearranged so as to be fitted onto the cylinder 1 with fairly good precision, such to stop on the lower part of the cylinder for the cooperation of its ledge 26 with a correspondent ledge 126 of the cylinder itself, and which is axially blocked in the desired angular position by means of at least one collar 27, screwed onto the threaded portion 7 of the cylinder 1. The numeral 28 indicates an anti-loosening grub screw which is fitted into a threaded through hole of the collar 27. The cylinder portion defined by the bushing 208 is equipped with a pair of ring-shaped recesses housing correspondent seals 29–29', and, in the space between these two seals, the cylinder itself is equipped with an outside ring-shaped recess 30, which, by means of at least one hole 31, is connected to chamber A. The hole 12 partly forming the opening C connecting the compensator to the cylinder 1, ends in the ring-shaped recess 30.

To avoid an unwanted axial movement of the bushing 208, following an excessive unthreading of the collar 27, the same bushing can be provided with a radial hole and blocked by a grub screw 32 or another suitable means binding partially said ring-shaped recess 30 too.

We claim:

1. Hydraulic shock absorber with compensator, for vehicles, comprising:

a cylinder sealed at one end which is provided with an attachment for one of the two parts of the vehicle which needs cushioning;

a stem presenting at one end another attachment for the other of said two parts of the vehicle and at the other end a piston engaged within said cylinder to make a sliding seal with said cylinder, said piston being equipped with valve means controlling the flow of a liquid between a first and a second pressure chambers formed within said cylinder by the opposed faces of said piston, the first pressure chamber being traversed by the said stem, said pressure chambers being filled with said liquid to ensure proper braking to the shock absorber during compression and expansion phases;

means connecting the second pressure chamber with a variable volume compensator device which absorbs and releases the liquid excesses which cannot flow from the second chamber to the first chamber, characterized in that the compensator is separate from the cylinder and that the two parts are prearranged for the reciprocal sealing connection by means of at least one spherical joint, so that the compensator can be rotated and inclined with respect to an axis substantially orthogonal to the axis of the cylinder, and can then be blocked in the desired position.

2. Shock absorber according to claim 1, where a portion of the spherical joint and the cylinder of the shock absorber itself are prearranged for a reciprocal sealing connection and with the possibility of cylindrical articulation around the axis itself of the said cylinder, some means being provided in order to block the two parts in the above desired angular position.

3. Shock absorber according to claim 2, where the extension carrying the spherical joint ends on the end opposed to the one connected to the compensator with a bushing, with cylindrical inside, which is fitted onto the cylinder of the shock absorber but with the possibility of turning, which abutes against a step of the cylinder itself and which is axially blocked onto such step and prevented from turning by at least one metal ring with anti-loosening means, screwed onto a threaded portion of the cylinder, the latter, in the portion engaged by said bushing, having at least one pair of ring-shaped recesses engaged by corresponding seals, which operate as seals with said bushing, between these recesses another ring-shaped recess being provided, where ends, on one side, the opening connecting to the compensator, and on the other, some holes communicating with the chamber with the bigger section of the shock absorber.

4. Shock absorber according to claim 3, where the cylindrical bushing has a radial hole sealed by a grub screw partially engaging the ring-shaped recess acting as a connecting collector of the inside hydraulic openings between shock absorber and compensator, all this being provided in order to prevent undesired axial displacements of said busing when the relative blocking ring is loosened.

5. Shock absorber according to claim 1, where the extension, provided to connect the compensator to the shock absorber itself, is divided into two portions, and one of these ends with a hemispherical seal and has an axial hole, which is threaded and connected to the chamber with a bigger section of the shock absorber, while the other portion of said extension, integral with the compensator, ends with a spherical head inserted in the said hemispherical seat with the interposition of at least one sealing ring, this extension portion having an axial cavity communicating with the chamber of the compensator and being equipped with a first cylindrical portion, initially threaded, which is then closed by means of a plug and of sealing means and which ends inside said spherical head with a tapered and spherical portion, concentric to said head and ending with a cylindrical portion with a diameter appropriately bigger than the diameter of an axially hollow screw, which is screwed into said threaded hole of said first extension portion, and which, with its head, abuts onto the spherical portion of the axial cavity of the second extension portion, with the interposition of elastic means so as to keep the parts of the spherical joint reciprocally coupled.

6. Shock absorber according to claim 5, where the screw connecting reciprocally the two parts of the spherical joint, has an axial cavity which, at least in its initial portion, has the shape of an embedded hexagon, so that it may be screwed by means of a hexagonal key.

7. Shock absorber according to claim 5, where the hemispherical seal of the spherical joint ends with an elastic clam, which surrounds the spherical head of the joint itself, and which can be tightened onto the head by means of the suitable clamping screw, so as to be able to block the joint in the desired position.

* * * * *